United States Patent
Kohlhéb et al.

[11] Patent Number: 5,833,257
[45] Date of Patent: Nov. 10, 1998

[54] ALTERNATING DRIVE FOR WHEELED VEHICLES

[76] Inventors: Robert Kohlhéb, Batthyány u. 20-22, H-1015 Budapest; Gabor Racz, Fillér u. 1., H-1024 Budapest; Olivér Vonhauser, Práater u. 58., H-1083 Budapest; Attila Kaboldy, Kerepesi út 32., H-1148 Budapest, all of Hungary

[21] Appl. No.: 714,135
[22] PCT Filed: Mar. 17, 1995
[86] PCT No.: PCT/HU95/00006
  § 371 Date: Sep. 16, 1996
  § 102(e) Date: Sep. 16, 1996
[87] PCT Pub. No.: WO95/25035
  PCT Pub. Date: Sep. 21, 1995

[30] Foreign Application Priority Data

Mar. 17, 1994 [HU] Hungary ................................. 94 7851

[51] Int. Cl.⁶ ........................................................ B62M 1/06
[52] U.S. Cl. ............................ 280/251; 280/255; 280/259
[58] Field of Search ..................................... 280/251, 252, 280/253, 254, 255, 256, 257, 258, 259, 260, 261, 262

[56] References Cited

U.S. PATENT DOCUMENTS

| | | | |
|---|---|---|---|
| 433,172 | 7/1890 | Jett | 280/251 |
| 609,498 | 8/1898 | Campbell | 280/252 |
| 2,185,698 | 1/1940 | Wright | 280/251 |
| 4,133,550 | 1/1979 | Brown | 280/241 |
| 5,121,654 | 6/1992 | Fasce | 280/255 |

FOREIGN PATENT DOCUMENTS

| | | |
|---|---|---|
| 46 969 | 11/1936 | France . |
| 374 070 | 4/1923 | Germany . |
| 27 58 795 A1 | 7/1979 | Germany . |
| 83 772 | 12/1994 | Germany . |

*Primary Examiner*—Kevin Hurley
*Attorney, Agent, or Firm*—Finnegan, Henderson, Farabow, Garrett & Dunner

[57] ABSTRACT

An alternating drive for wheeled vehicles comprises two opposite pedals which can move on a circular path about a pedal shaft secured on the cycle frame. The alternating drive is characterized in that it is equipped with two cranks (26, 27; 26a, 27a; 26b, 27b) which can be moved within a predetermined oscillating angle range about an auxiliary shaft (25) secured to the frame (10). Between the cranks (26, 27; 26a, 27a; 26b, 27b) and the pedals (21) is a driver connection which transforms the circular motion into an alternating oscillating motion with phases mutually offset by a half oscillation period. Disposed on each side of the axle (50) of the driven wheel (12) is a free-wheel mechanism (56, 57). The free-wheel mechanism (56, 57) lock in opposite direction and are connected to the individual cranks (26, 27; 26a, 27a; 26b, 27b) by mutually independent traction elements (29; 82, 83).

12 Claims, 14 Drawing Sheets

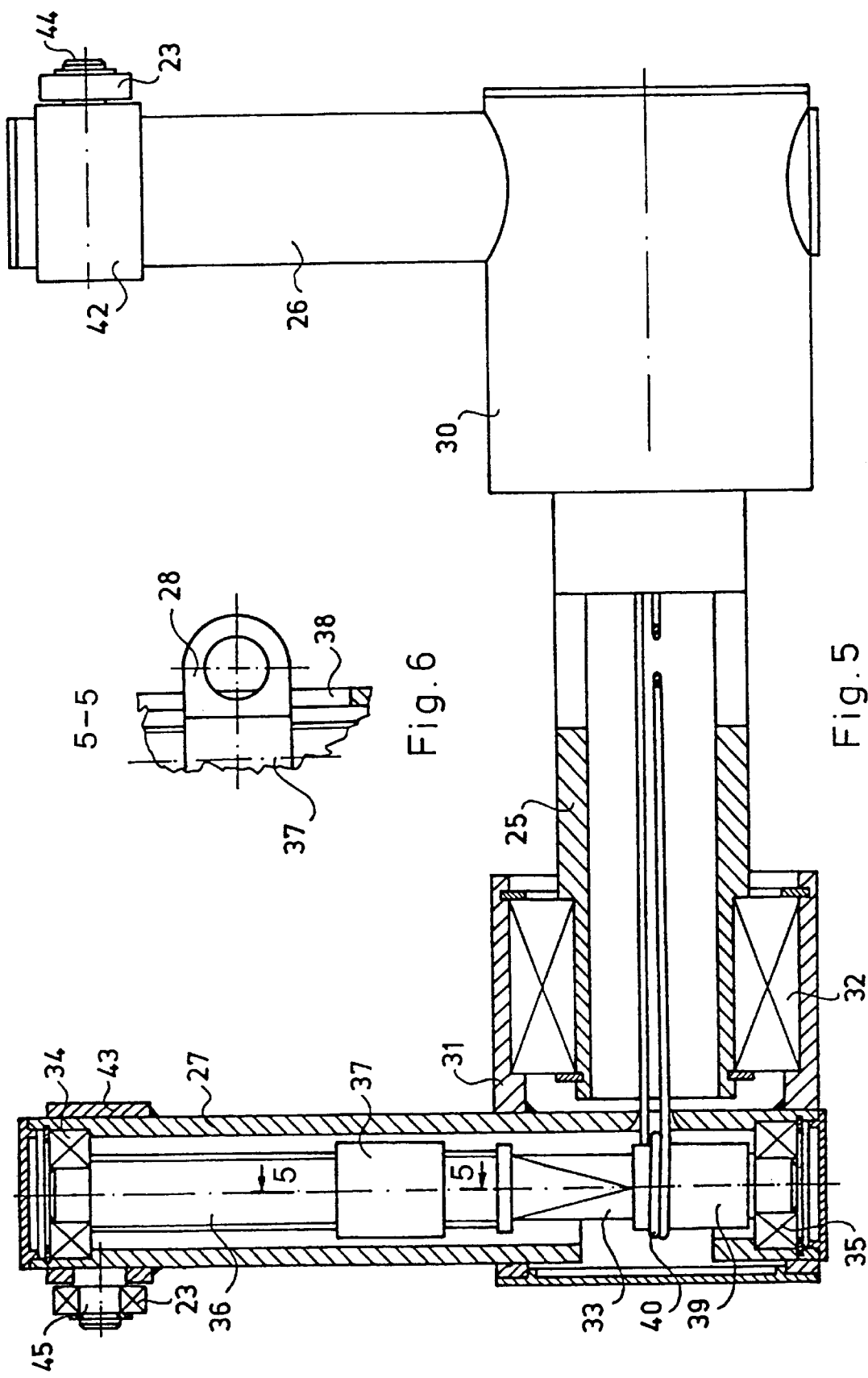

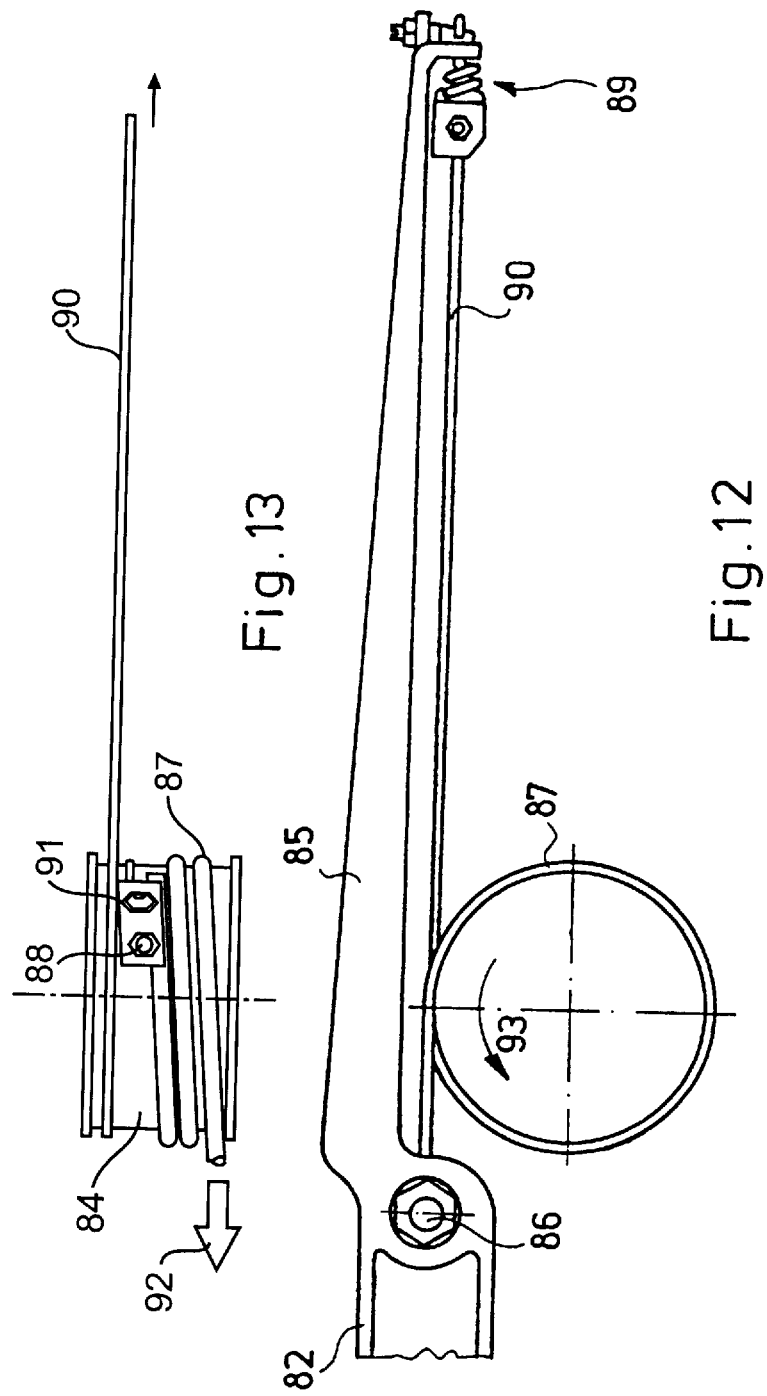

ALTERNATING DRIVE FOR WHEELED VEHICLES

The invention relates to an alternating drive for wheeled vehicles comprising a pair of pedals moved along a circular path around a pedal shaft pivoted to the frame of the vehicle. In the following specification the term "bicycle" will be used to designate not only the conventional types of bicycles with two wheels but also all kinds of wheeled vehicles driven by a rider wherein the wheels thereof are driven by the transported person by means of pedals or rotating handles through a mechanical transmission. Such vehicles are e.g. the three-wheeled hand carts.

In the most commonly used types of bicycles with pedal drive the pedal rotates a gear engaging a chain which engages a further gear mounted on the shaft of the driven wheel being normally the rear wheel. The driven gear is coupled to the driven shaft by means of a free-wheel mechanism. The transmission between the pedal and the driven wheel can in several embodiments be changed in discrete steps by means of a transmission changer. The function of the transmission changer is based on the possibility that the chain can be coupled to several different gears. In case of such systems the transmission can be changed only when the chain is actually moving i.e. the bicycle is actually driven, although there can be a need to change transmission even when the bicycle is standing.

The term "alternating drive" refers to a drive differing from conventional chain drives in that the pulling force of a pair of pulling elements reciprocating in opposite directions acts on the driven wheel. Such an alternating drive is described e.g. in EP 0 210 336 A2, wherein the rider treads on a pair of pedals moving up and down. At both sides of the hub of the rear wheel respective free-wheels are provided comprising respective gears, and respective ends of a chain are connected to the central part of each pedal. The two branches of the chain are coupled to the gears of the free-wheels through a direction-reversal shaft, and the branches are united at a common roller. The transmission ratio between the pedal and the driven wheel can be adjusted by sliding the heights of the connection points of the chain along the pedals.

In such a drive the movement of the rider, his load and the characteristic curve of the displacement of the feet substantially differ from similar characteristics of conventional bicycles driven by pedals moved along circular paths which characteristics have become customary. Traditions are very strong in the field of riding bicycles, therefore only designs can expect wider public acceptance in which the leg movement of the rider, the forces acting on the legs and the movement of the bicycle are all similar to the sensations experienced at traditional bicycles.

Such a new design is e.g. the drive with "bio-pace" characteristic used mainly in mountain bikes, which is a chain drive but the driving gear has the shape of a rhombus with rounded corners.

The object of the invention is to provide an alternating drive for wheeled vehicles which can provide the sensation of riding conventional bicycles, which does not require the use of a chain, wherein the transmission ratio can be changed continuously even if the vehicle is standing, and in which the extent of the idle range of the pedal, characteristic to circular pedal movement, can be decreased.

For meeting the above objectives an alternating drive has been provided for wheeled vehicles, in which a pair of pedals are moved along a circular path around a pedal shaft pivoted to the frame of the vehicle. The drive according to the invention comprises a pair of swinging arms pivoted around an auxiliary shaft attached to the frame and allowing a swinging movement within a predetermined angular range, and respective transmission means are arranged between the swinging arms and the pedals for converting the circular movement of the pedals into an alternating swinging movement with a phase difference corresponding to a half swinging period, and wherein at both sides of the shaft of the driven wheel of the vehicle respective free-wheel mechanisms are arranged with opposite locking directions, and the free-wheel mechanisms are connected with the respective swinging arms by means of independent pulling elements.

In a first embodiment used for the conversion of the circular movement into a swinging movement, the swinging arms are coupled to respective predetermined portions of the pedals by means of respective pulling bars pivoted at both ends.

Preferable geometrical conditions will be obtained if between the pedal shaft and the pedal a pair of shanks are provided which are attached rigidly to each other so that the shanks close an angle, and one end of the associated pulling bar is coupled to the interconnection zone of the two shanks.

In a further way of converting the circular movement into a swinging movement between the pedal shaft and the pedal a pair of shanks are provided which are attached rigidly to each other by means of a short connection shaft and the shanks close an angle, and in the swinging arms respective elongated openings are provided and the short shaft interconnecting the two shanks of the pedal are fitted directly or through a bearing in the opening. Such a design represents a link-motion transmission.

In a third embodiment for converting the circular movement into a single movement, the pedals comprise respective eccentric discs so that the pedal shafts extend therethrough, and each of the eccentric discs defines respective slots extending in a closed curved line, said slots face in the direction of the associated swinging arm, the slots have identical shape and they are arranged in mirror symmetrical position relative to the axis of the pedal shaft and surround the pedal shaft in an eccentric way, and the swinging arms engage in the associated slots by means of respective guiding elements fitted therein.

In this embodiment it is preferable if the guiding element is made by respective bearings fitted loosely in the associated slot, and the bearings are connected to a central part of the associated swinging arm.

The shape of the slots defines the driving characteristics, and it is preferable if such shape corresponds to the characteristics of conventional chain drives with a chain wheel having either a circular or rounded rhombus shape.

In each one of the above described embodiments the transmission ratio can be continuously changed if the connection points on the swinging arms for the pulling elements are designed in such a way that their position can be adjusted within a range between two end positions.

For adjusting the two connection points it is preferable if an adjusting mechanism is provided that uses an adjusting wire, in which the wire is connected to a transmission changer arranged at a convenient place of the frame of the bicycle.

The alternating movement of the swinging arms can be transmitted to the two rear free-wheels by means of respective wires exposed only to pulling forces.

In that case the free-wheel mechanisms comprise respective biasing assemblies which act in the free direction of the free-wheels, and these assemblies keep the wire stretched during the unloaded period of the associated swinging arm.

The free-wheel mechanisms comprise preferably respective wire drums and the interior of the drum comprises the spring required for the biasing assembly, and the end section of the wire is wound around the outer surface of the drum.

The connection between the swinging arms and the free-wheel mechanisms can be designed in such a way that respective rigid pulling bars are pivoted to each swinging arm, and respective parts of the pulling bars located during the reciprocating movement of the bars in front and behind the rear shaft of the rear wheel are connected to respective wires wound around the associated free-wheel mechanism.

In this embodiment it is preferable if the outer sides of the free-wheel mechanisms are designed as wire drums and the parts of the pulling bars which are located in front of the rear shaft are coupled by means of respective biasing elements to first ends of respective pulling wires and the other ends of said wires are coupled to the wire drums, and those parts located behind the rear shaft are coupled through respective wire biasing mechanisms to first ends of biasing wires having other ends coupled to the wire drums.

The solution according to the invention can be designed without using swinging arms at all, in such designs, however, it is difficult to change the transmission ratio. In such an embodiment the pedals comprise eccentric discs and the pedal shaft is extending through the discs, the eccentric discs define respective slots with closed contour line, the slots eccentrically surround the pedal shaft and the slots are arranged in mirror symmetrical position relative to the axis of the pedal shaft. Respective guiding elements are fitted in the slots, and on both sides of the driven wheel of the bicycle respective free-wheel mechanisms are arranged which have opposite locking directions, and the free-wheel mechanisms are coupled through independent pulling elements to the guiding elements.

The alternating drive according to the invention has a simple design and in spite of the visible differences compared to conventional drives of ordinary bicycles, owing to the movement of the pedals along respective circular paths the bicycle provides a similarly pleasant driving sensation. The transmission ratio of the drive can be adjusted both when the bicycle is driven and when it is standing.

The alternating drive will now be described in detail on the basis of exemplary embodiments, in which reference will be made to the accompanying drawings. In the drawings:

FIG. 5 shows the top view of a detail comprising the two swinging arms and the auxiliary shaft in half-section;

FIG. 6 shows the sectional view of an enlarged detail of FIG. 5;

FIG. 12 shows the side view of an alternative embodiment for driving the rear wheel;

FIG. 13 shows the top view of the embodiment according to FIG. 12;

FIG. 17 shows schematically a drive without using swinging arms, in which the transmission is constant;

Figure 1:
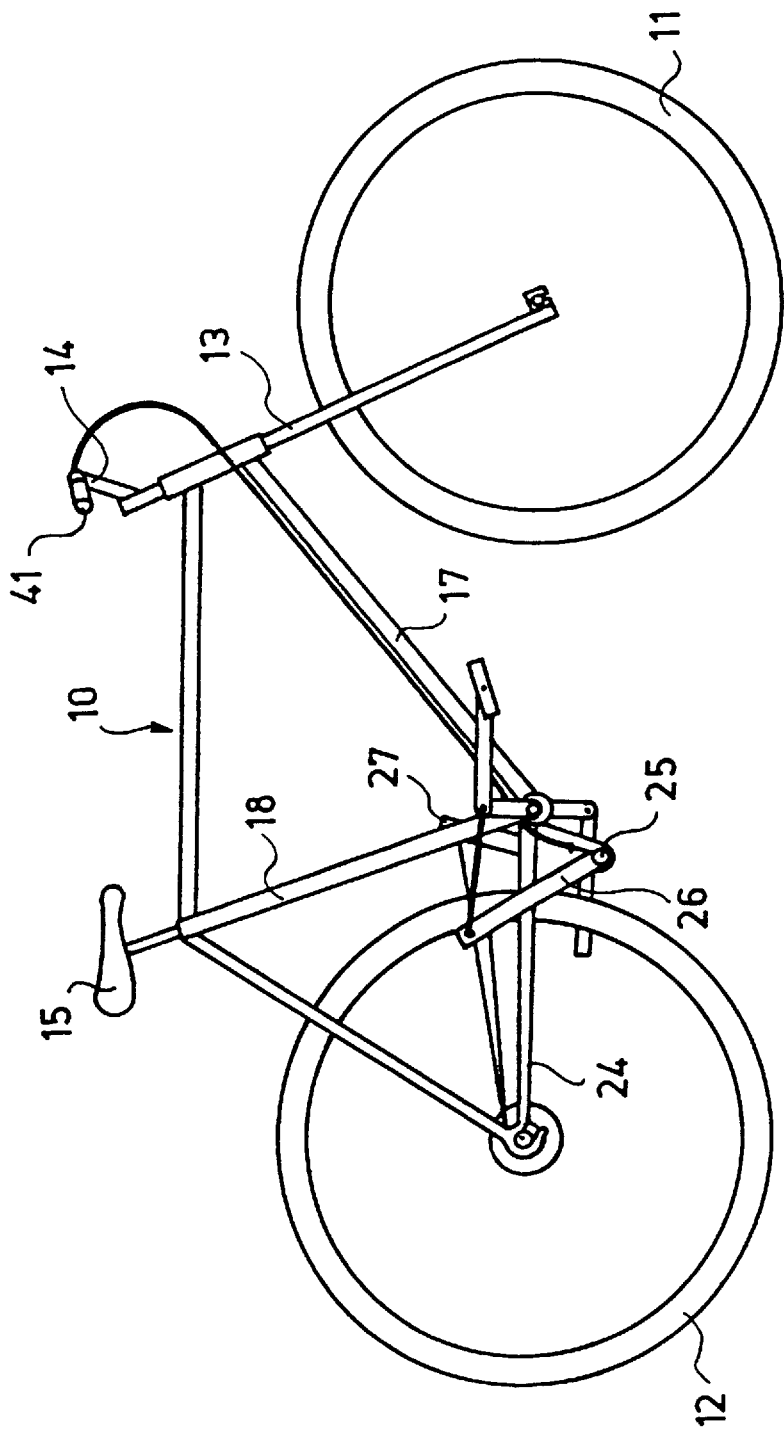
FIG. 1 shows the side view of a bicycle equipped with a drive according to the invention.

The bicycle shown in FIG. 1, apart form the transmission system, has a conventional design. It has a rigid frame 10, a freely rotating front wheel 11, a driven rear wheel 12, a fork 13 coupled to the frame 10 with a pivotal connection, handlebars 14 and a saddle 15. The front wheel 11 is mounted in a conventional way to the lower end of the fork 13.

Figure 2:
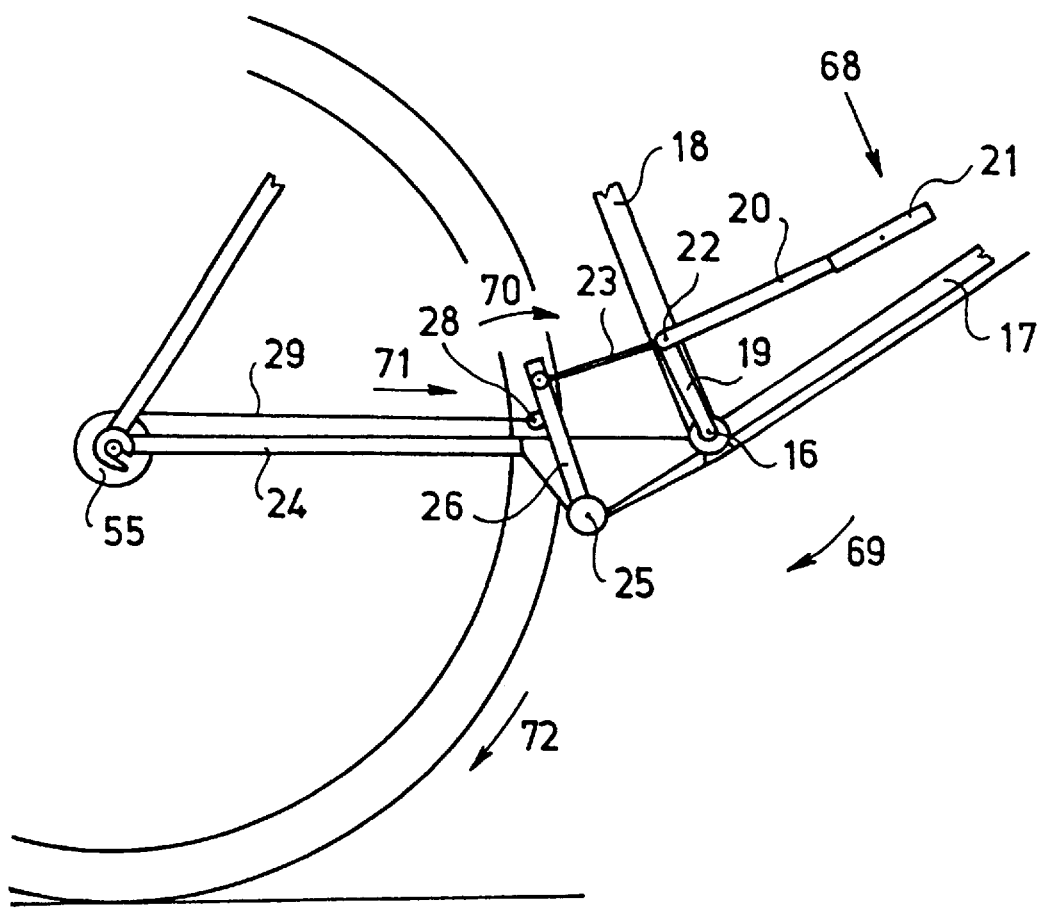
FIG. 2 shows an enlarged detail of FIG. 1.
Figure 3:
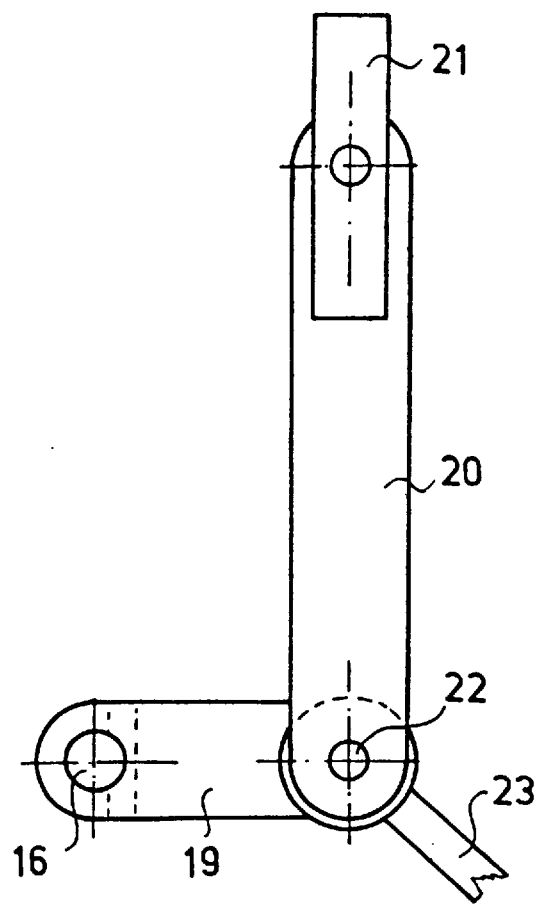
FIG. 3 shows the side view of the design of the pedal assembly.
Figure 4:
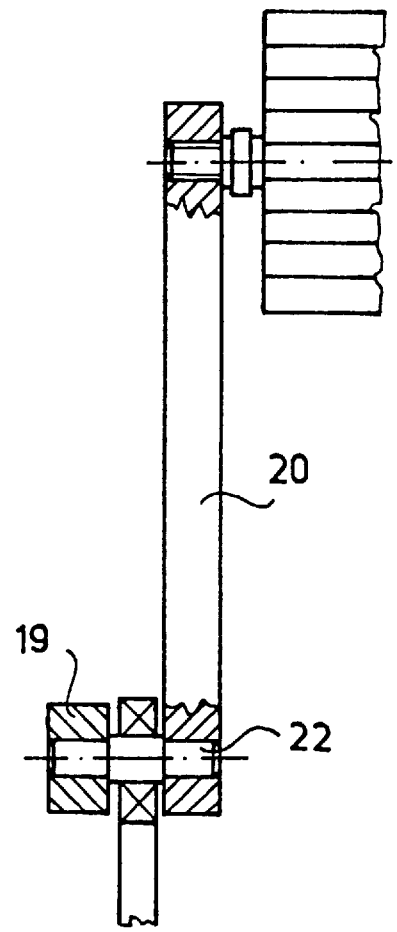
FIG. 4 shows the front view of the pedal assembly partly in section.

The transmission is driven by a pair of pedals arranged at respective sides of the frame 10 in a mirror symmetrical arrangement relative to pedal shaft 16. In an embodiment of the invention in each side the pedal arms are not made by linear shanks as in case of conventional designs but they are constituted by two shanks attached rigidly to each other by a connection to take a cranked form shaft, and a pulling bar is hinged to the connection shaft of the shanks. The circular rotation movement of the pedals around the pedal shaft 16 will be transformed into a reciprocating linear movement of the pulling bars. For the sake of better illustration FIG. 2 shows only the components which fall in the plane of the drawing. The connection between the pedal and the pulling bar is shown in the enlarged details of FIGS. 3 and 4.

FIG. 2 shows that the pedal shaft 16 is arranged in the connection zone of bars 17 and 18 of the frame 10 that join each other as the arms of the letter "V", and pedal 21 is rigidly connected to the shaft 16 by means of shanks 19 and 20. The inner shank 19 is coupled by means of a wedge shaped bolt to the pedal shaft 16 as shown by the dashed line in FIG. 3. In the other end of the shank 19 a bore is provided, in which a first end of a connection shaft 22 extending parallel to the pedal shaft 16 is pressed. The two shanks 19 and 20 extend in rectangular direction. The central zone of the connection shaft 22 between the two shanks 19 and 20 is surrounded by a bore made in an end region of pulling bar 23. There is a slight radial play between this bore and the connection shaft 22, therefore the pulling bar 23 can be freely turned around the shaft 22. The outer end of the shank 20 is coupled in conventional way to the pedal 21 provided with ball bearings.

The frame 10 has a rear fork 24 extending between the pedal shaft 16 and the rear wheel 12, and in the connection zone of the rear fork 24 and the frame 10 an auxiliary shaft 25 is provided as shown in FIG. 2, and respective swinging arms 26 and 27 are pivoted to the ends of the auxiliary shaft 25. FIG. 2 shows only the swinging arm 26. The rear end of the pulling bar 23 is coupled by means of a bearing to the upper region of the swinging bar 26.

When the pedals 21 are rotated, the pulling bar 23 forces the swinging arm 26 to an alternating swinging movement around the auxiliary shaft 25 within a predetermined angular range. On the rear side of the swinging arm 28 there is provided a lug 28 for engagement with a pulling element 29 e.g. a wire coupled to the hub of the rear wheel 12, and the distance between the auxiliary shaft 25 and the lug 28 is preferably adjustable. On both sides of the hub of the rear wheel 12 respective spring biased free-wheels are provided, and the rear ends of the pulling elements are connected to the free-wheels. The pulling force of the pulling bars drives the rear wheel by acting a torque on the free-wheels in their locking directions.

FIGS. 5 and 6 show an exemplary embodiment for the design of the auxiliary shaft 25 and of the swinging arms 26, 27.

Respective sleeves 30, 31 are welded to the lower ends of the tubular swinging arms 26, 27 that extend normal thereto. The sleeves 30, 31 are coupled by means of respective ball bearings to the ends of the auxiliary shaft 25 of which FIG. 5 shows only the ball bearing 32. In the interior of the swinging arm 27 a spindle 33 is provided which is held by means of respective ball bearings 34 and 35 at the two ends. A section 36 of the spindle 33 is threaded engaging a threaded nut 37. An axial slot 38 is provided along the rear side of the swinging arm 27 facing the rear wheel 12, and the lug 28 which is connected to the nut 37, is projecting out of the slot 38. When the spindle 33 is rotated, the nut 37 cannot follow the rotation but, depending on the direction of rotation, it will move in upward or downward direction, whereby the height of the pulling element engaging in the lug 28 can be adjusted.

A hollow cylinder 39 is attached to the lower portion of the spindle 33 that can slide freely in axial direction but cannot be turned relative to the spindle 33, and a few turns of a wire 40 are wound around the cylinder 39. The movement of the wire 40 results in the turning of the spindle 33. A portion of the wire 40 extends in the interior of the other swinging arm 26 and it is wound around a second similar spindle, and the two free ends of the wire 40 are lead by means of appropriate rollers along the frame 10 till the handlebars 14 (FIG. 1) and they are fixed at a transmission control element 41. When the transmission control element 41 is moved, both ends of the wire 40 will move in opposite directions and this rotates both spindles and the associated mechanisms, whereby the height of both lugs, and the ratio of the transmission will be changed.

The swinging arms 26, 27 are driven by the pulling bars 23 moved by the pedals 21 because at the upper ends of the swinging arms 26, 27 respective sleeves 42, 43 are provided which are pivoted to the rear ends of the pulling rods 23 by means of bolts 44, 45.

The above described driving mechanism ensures that the rotation of the pedals results in a swinging movement of the swinging arms 26, 27 with opposing phases around the auxiliary shaft 25. The pulling bars 23 are pivoted at both ends and they can exert forces on the swinging arms 26, 27 only in their own bar directions. The rear wheel 12 is rotated by means of the opposingly swinging arms 26, 27 through the pulling element 29. The length of the movement of the pulling elements 29 during a full revolution of the pedal depends on the distance between the lug 28 and the auxiliary shaft 25, and this distance can be changed by the transmission control element 41 between two extreme values.

Figure 7:
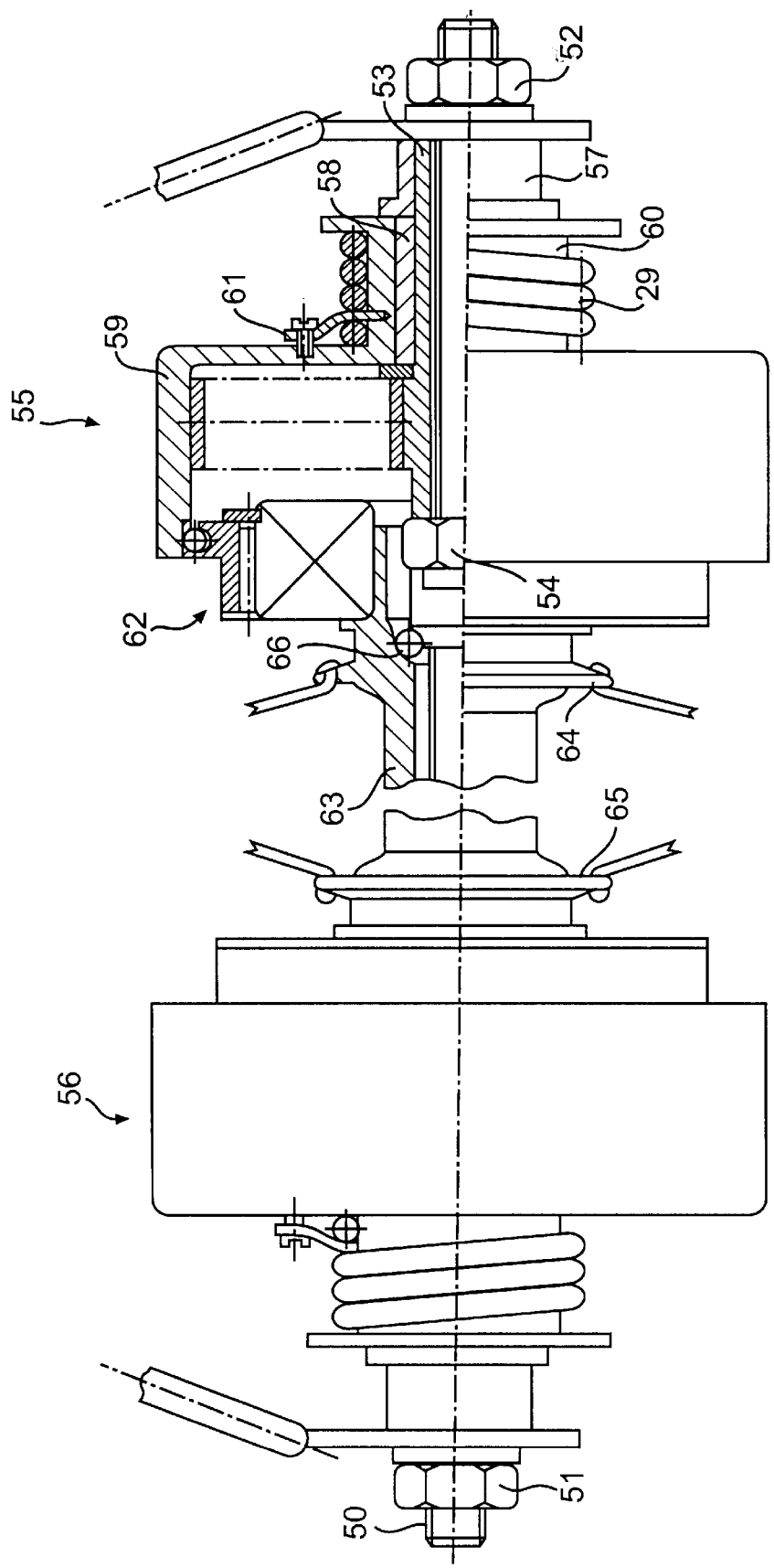
FIG. 7 shows the half-sectional view of the hub of the driven wheel.
Figure 8:
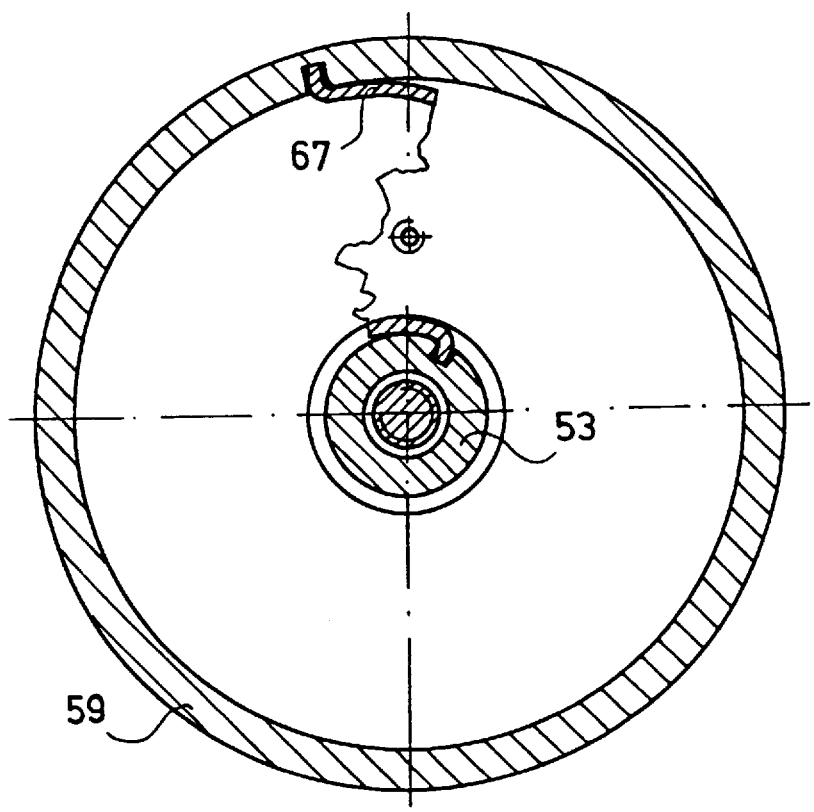
FIG. 8 shows the inside of the drum 59 partially in section.

The assembly of the transmission elements at the rear wheel 12 is shown in FIGS. 7 and 8. The assembly shown in FIG. 7 is mounted symmetrically on the two sides of the hub of the rear wheel 12. In FIG. 7 the left side is shown in elevation view and the right side is shown in half sectional view. The two ends of the rear shaft 50 of the rear wheel 12 are connected to the rear fork of the frame 10 by means of nuts 51, 52 and washers. At both sides of the rear shaft 50 respective stationary sleeves 53 are provided and the outer face of each sleeve 53 abuts the inner surface of the rear fork. The inner ends of the sleeves are supported by respective nuts 54. The sleeve 53 kept between the nuts 52 and 54 supports a free-wheel mechanism 55, which has the same design as the free-wheel mechanism 56 on the other side of the rear shaft 52, however, the locking directions of the two mechanisms 55, 56 are opposing i.e. both mechanisms get locked when the rear wheel 12 is rotated forward thereby. The free-wheel mechanism 55 comprises a distance member 57 mounted on the sleeve 53, a bearing sleeve 58, a drum 59 having a wire guiding mantle 60 and a wire locking element 61, and finally a free-wheel assembly 62 which provides a connection between the drum 59 and an inner sleeve 63 that allows a free rotation in a first direction and gets locked in the other direction.

The inner sleeve 63 has a conventional design and it is provided with a pair of rims 64, 65 in which the spokes of the rear wheel 12 are fixed. The inner sleeve 63 is coupled by means of ball bearings, of which FIG. 7 shows the right hand side ball bearing 66.

A biased spiral spring 67 is arranged in the drum 59 associated with the free-wheel mechanism 55 connected between the stationary sleeve 53 and the outer wall of the drum 59 (FIG. 8) which tries to turn the drum 59 in the direction of the free rotation with respect to the sleeve 53. The pulling element 29 is constituted by a wire wound around the outer surface of the drum 59 and one end thereof is fixed by the wire locking element 61 and the other end engages the lug 28 provided in the swinging arm 26. The distance between the two extreme positions of the lug 28 will be maximum when the lug 28 is in its outermost position, and the wire should be wound around the mantle 60 of the drum 59 along a path being at least as long as this maximum distance. The spring 67 tries to wind up the wire on the mantle 60 of the drum 59.

When the pedal of the bicycle is rotated, the two swinging arms 26, 27 will swing forward and backward in an alternating way between their extreme positions, as already explained. The continuously biased pulling elements 29 provide connection between the swinging arms 26, 27 and the free-wheel mechanisms 55, 56. In the position shown in FIG. 2 a force designated by arrow 68 will act on the pedal 31. The shanks 19, 20 will rotate around the pedal shaft 16 in a clockwise direction as shown by arrow 69. The pulling bar 23 will be moved forward and the swinging arm 26 is turned thereby in the direction of arrow 70 around the auxiliary axis 25. The pulling element 29 moves forward in the direction of arrow 71 and loads the free-wheel mechanism 55 in locking direction, whereby the rear wheel 12 will be turned under the effect of the pulling force forward in the direction of arrow 72. At the same time the swinging arm 27 at the other side will move backwards, and the associated pulling element (wire) will be wound by the spring in the free-wheel mechanism 56 on the drum. During the forward rotation of the rear wheel 12 the free-wheel mechanism 56 allows the rotation of the drum by means of the effect of the spring in a direction opposite to the rotation of the wheel. The path length of the rotation of the drum under the effect of the spring is sufficient to wind up the wire even during the highest distance of the swinging movement. When the pedal 21 travels over the idle point, the swinging direction of the swinging arms 26, 27 will be reversed, and the free-wheel mechanism 56 gets locked and the previously locked free-wheel mechanism 57 gets released, and its biasing force winds up the pulling element 29 that moves now in reverse direction.

The full displacement range of the pulling element 29 can be changed by adjusting the height of the lug 28, whereby the transmission ratio of the drive will also be changed. In contrast to conventional bicycles the transmission ratio can be continuously varied at any time (even if the wheels are not rotating).

Figure 9:
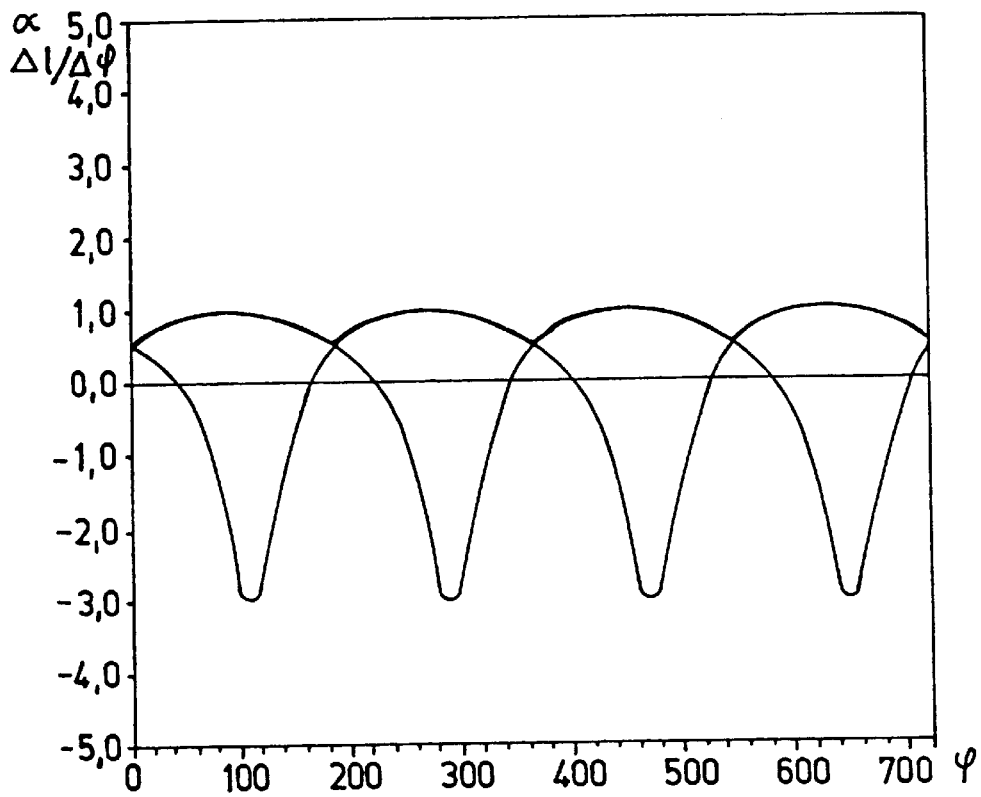
FIG. 9 shows the variation of the displacement of the pulling element as a function of the displacement angle of the pedal shaft.

The diagram of FIG. 9 shows the displacement of the pulling element 29 as a function of the angular displacement of the pedal shaft 16. The drawing shows the diagrams of both pulling elements (which always move in opposite directions). In every moment only the one of the pulling elements is loaded which moves forward with the highest speed. In the diagram the heavy line shows the active sections of the displacements of the pulling elements, and the intersection points of the individual sections correspond to the reversals of the active sections of the pulling elements.

Figure 10:
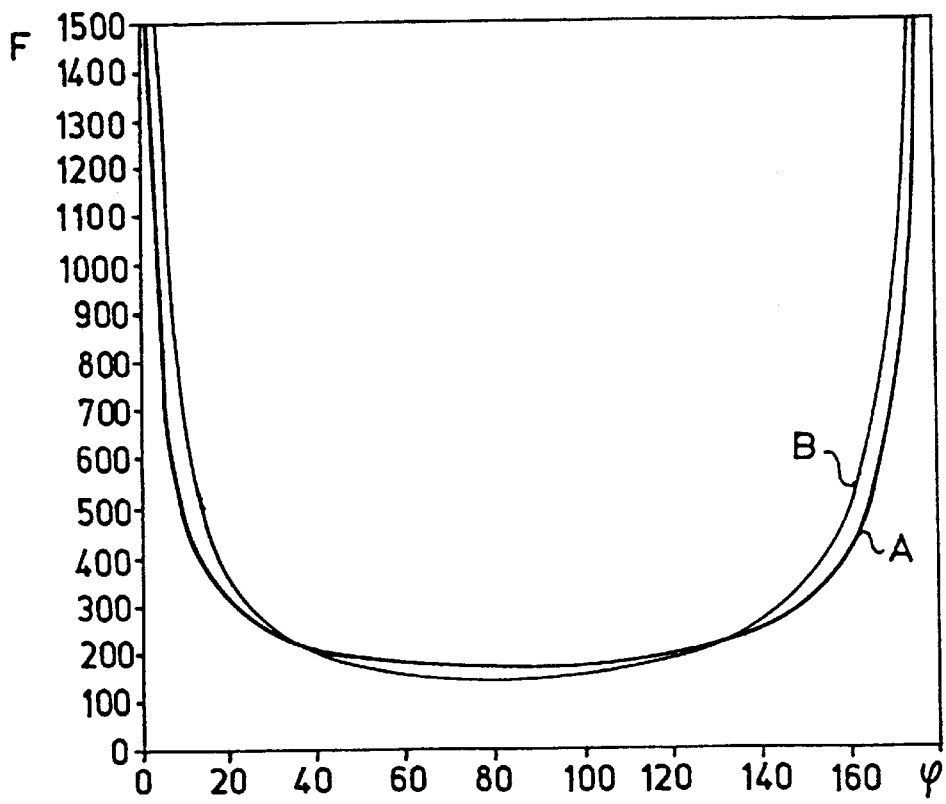
FIG. 10 illustrates two diagrams showing the change of the pedal force as a function of the angular displacement in case of a conventional drive and of a drive according to the invention.

FIG. 10 shows the pedal force F of a bicycle driven under constant load as a function of the angular position of the pedal shaft 16. The term "pedal force F" designate the component of the force acting on the pedal 21 falling in the direction of the rear bar 18 of the frame 10, which component is substantially in the direction of a line interconnecting the center of the saddle 15 with the center of the pedal shaft 16. In FIG. 10 curve A relates to the drive according to the present invention, and curve B relates to a conventional (chain-driven) bicycle. In case of the drive according to the invention, the force is uniform in a wider angular range than at conventional drives, thus the angular range associated with the idle section is smaller. The uniform force required in a wider angular range will be less exhaustive for the rider, therefore cyclists will find the driving of the bicycle according to the invention less tiring.

Figure 11:
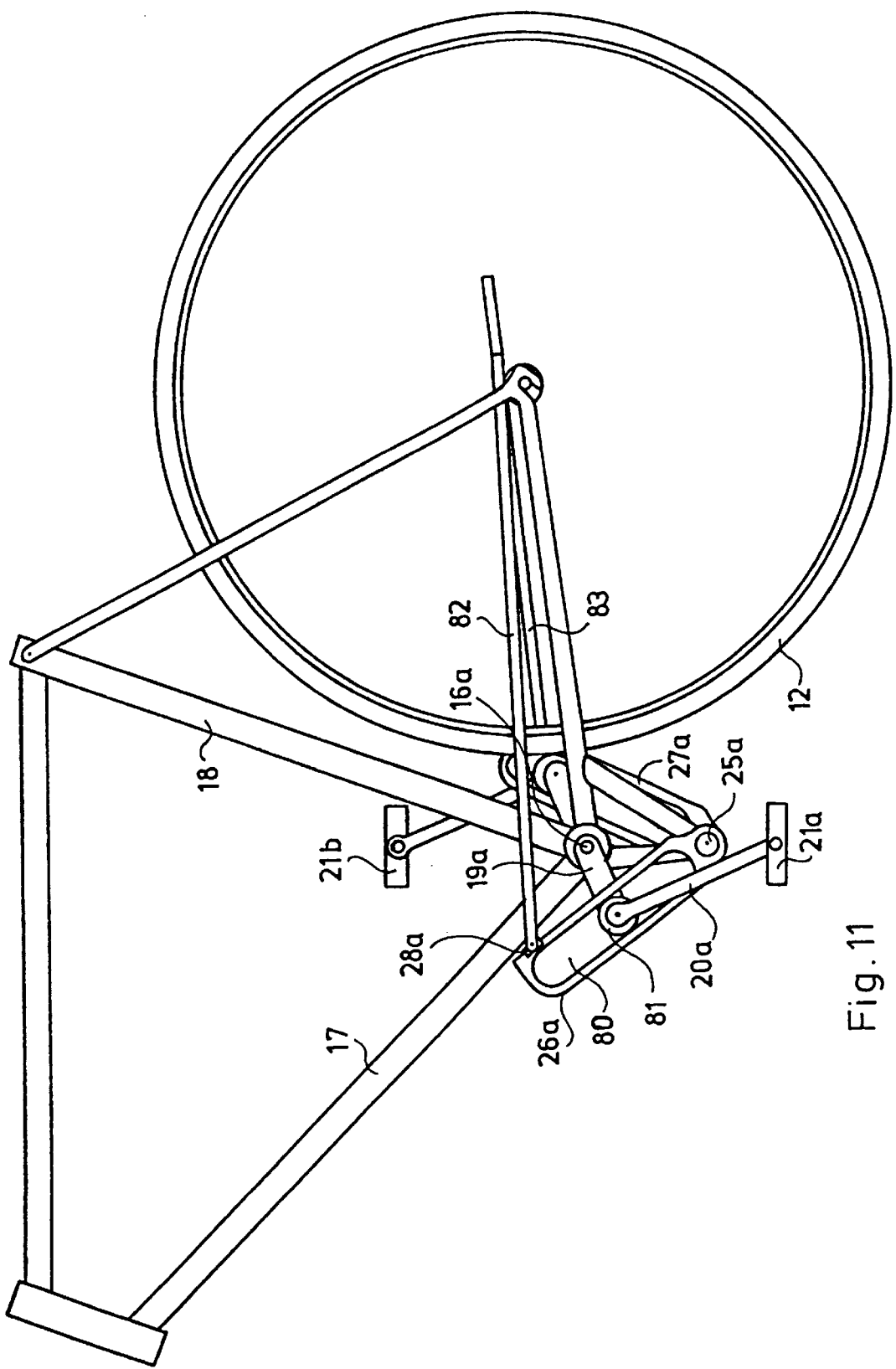
FIG. 11 shows an alternative embodiment for moving the swinging arms.

A further embodiment of the alternating drive according to the invention is shown in FIG. 11. In this embodiment the auxiliary shaft 20a lies below the pedal shaft 16a and slightly behind thereto. Instead of the linear tubular swinging arms 26, 27 used at the previous embodiment, the swinging arms 26a, 27a shown in FIG. 11 are provided with respective openings 80 having elongated parallel side-walls. The pedal assembly also comprises two rigidly connected bars 19a, 20a closing an angle, preferably right angle. The two bars 19a and 20a are interconnected by a short shaft normal to the axis of the drawing, and this shaft is surrounded by a bearing 81. The outer ring of the bearing 81 fits loosely in the internal opening 80.

When the pedals 21a, 21b are rotated, the inner ring of the bearing 81 will force the shaft interconnecting the bars 19a, 20a to move along a circular path. Owing to the fact that the bearing 81 can freely move in the internal opening 80 along the direction of the bar, the swinging arms 26a, 27a will take a swinging movement. The presence of the bearing 81 minimizes the friction losses of such a link drive.

For moving the swinging arms 26a, 27a there is no need for the pulling bar 23 as shown in FIG. 2 because the bearing 81 at the knee region of the pedal arms is guided by the opening 80 and converts the rotating movement of the pedals into a swinging movement.

The embodiment shown in FIG. 11 differs additionally from that shown in FIGS. 2 and 7 regarding the driving of the rear wheel 12. Respective connection elements e.g. connection element 28a shown in FIG. 11 are coupled to the swinging arms 26a and 27a comprising a short hinge axis. The connection element 28a is coupled through a mechanism not shown in the drawing to the transmission control lever, and the distance between the connection element 28a and the auxiliary shaft 25a can be changed continuously within a predetermined range. The design of the transmission control mechanism has not been shown, however, such a control which moves the connection element 28a along the swinging arms 26a, 27a forms a routine task for the man skilled in the art.

The hinge arranged in the connection element 28a is connected with a rear pulling bar 82 (on the other side 83). The drive constituted by the rear pulling bars 82, 83 is shown in FIGS. 12 and 13 in detail. On both sides of the shaft of the rear wheel 12 respective wire drums are provided of which FIG. 13 shows only the wire drum 84. The wire drums are connected to the rear wheel 12 by means of oppositely directed free-wheel systems arranged in the interior of the associated wire drums. The rear part 85 of the rear pulling bar 82 has a design similar to the bow of a violin i.e. it holds the wire at both ends and it is also provided with a wire biasing mechanism. The wire catch 86 is arranged at the front end of the rear part 85 and it catches a wire 87 loaded by the pulling force transmitted to the rear wheel 12, several windings of this wire 87 are turned on the wire drum 84, and the other end of the wire 87 is connected to the wire drum 84 at the catch 88. The rear end of the rear part 85 is connected through a wire biasing mechanism 89 with one end of a biasing wire 90. Similarly, several windings of the biasing wire 90 are turned on the wire drum 84 and the other end of the biasing wire is coupled to the wire drum 84 by means of catch 91.

The swinging movement of the swinging arm 26a results in a reciprocating forward and backward movement of the pulling bar 82. In FIGS. 12 and 13 the elements are shown at their rearmost position, in which the rear pulling bar 82 moves forward along the arrow 92. The loaded wire 87 is pulled forward via the wire catch 86 and this movement turns the wire drum 84 in the direction of the arrow 93. The free-wheel mechanism inside the wire drum 84 locks when being turned in the direction of the arrow 93, whereby the pulling force acting on the loaded wire 87 turns the rear wheel 12 forward. During rotation of the wire drum 84 the biasing on the wire drum 84, and at the same time the loaded wire will be wound down from the drum. This kind of movement lasts as long as the swinging arm 26 reaches the end position of its forward movement. At this moment the rear pulling bar 82 takes the extreme position in forward direction and the pulling bar 83 at the other side of the bicycle takes the extreme position in backward direction. When the direction of the movement is reversed, the other rear pulling bar 83 will be pulled forward and the free-wheel mechanism associated therewith will get locked and exerts a torque on the rear wheel 12. The rear pulling bar 82 will pull the biasing wire 90 backwards through the wire biasing mechanism 89, this biasing force is, however, much smaller than the pulling force in the other direction, because the free-wheel mechanism in the wire drum 84 is now in a free-running state. The previously wound biasing wire 90 will now be wound down from the wire drum 84, while the pulling wire 87 will be wound on, and the elements will move again to the rear extreme position illustrated in FIG. 12. The biasing wire is preferably thinner and dimensioned for a smaller load than the pulling wire 87.

This drive is substantially better than the one shown in FIGS. 7 and 8 for several reasons. In the respective swinging periods there is no need for biasing any spring to obtain the bias required for winding up the wire in the next unloaded period. The idle work required for biasing the springs can be spared. Another advantage lies in the use of a much simpler assembly at the hub of the rear wheel 12.

The movement of the rear wheel 12 by means of the pulling bars 82, 83 as described in connection with FIGS. 12 and 13 can be used also in case of the embodiment shown in FIGS. 1 to 6.

Figure 14:
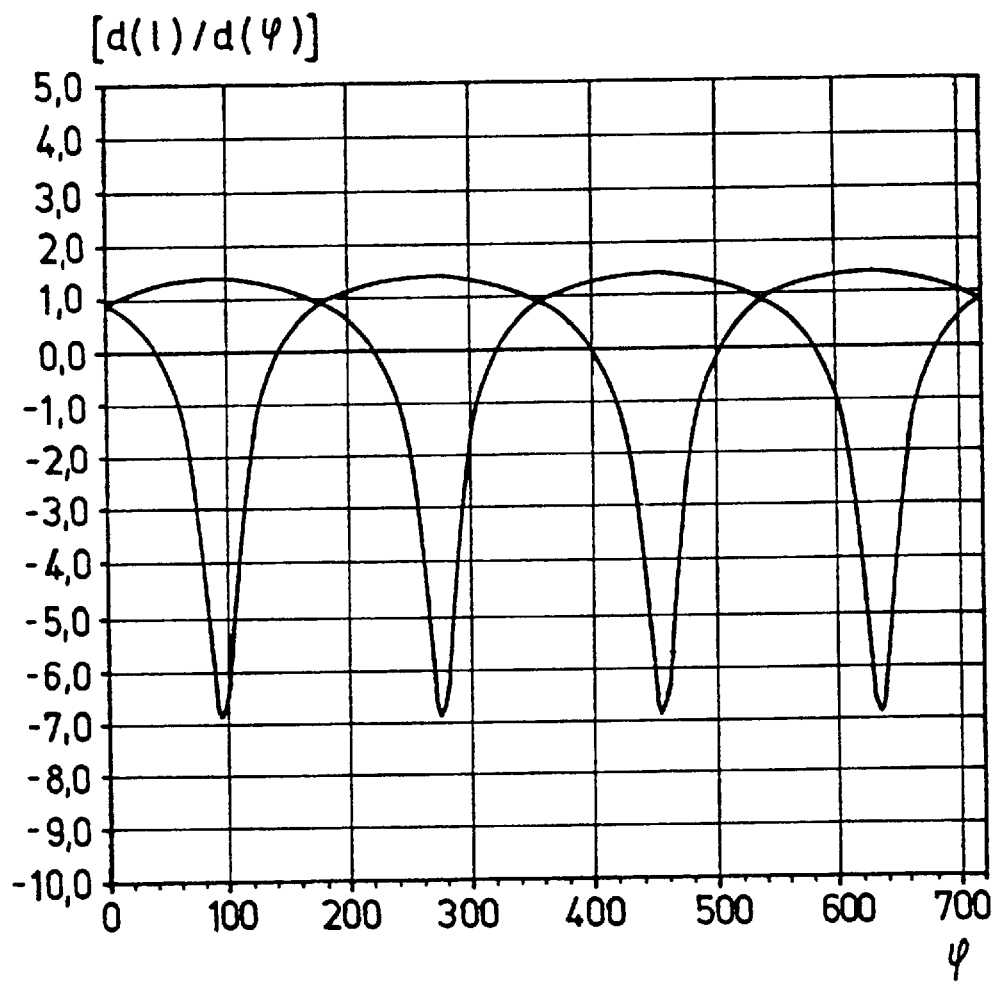
FIG. 14 shows a diagram similar to that shown in FIG. 9 for the displacement versus angular displacement curve.

The diagram of FIG. 14 shows the change of the displacement of the rear pulling bar 82 as a function of the angular displacement of the pedal shaft 16a in case of a drive according to the embodiment shown in FIGS. 11 to 13. The curve is similar to the one shown in FIG. 9, however, it is slightly more flat i.e. the driving conditions are more preferable.

Figure 15:
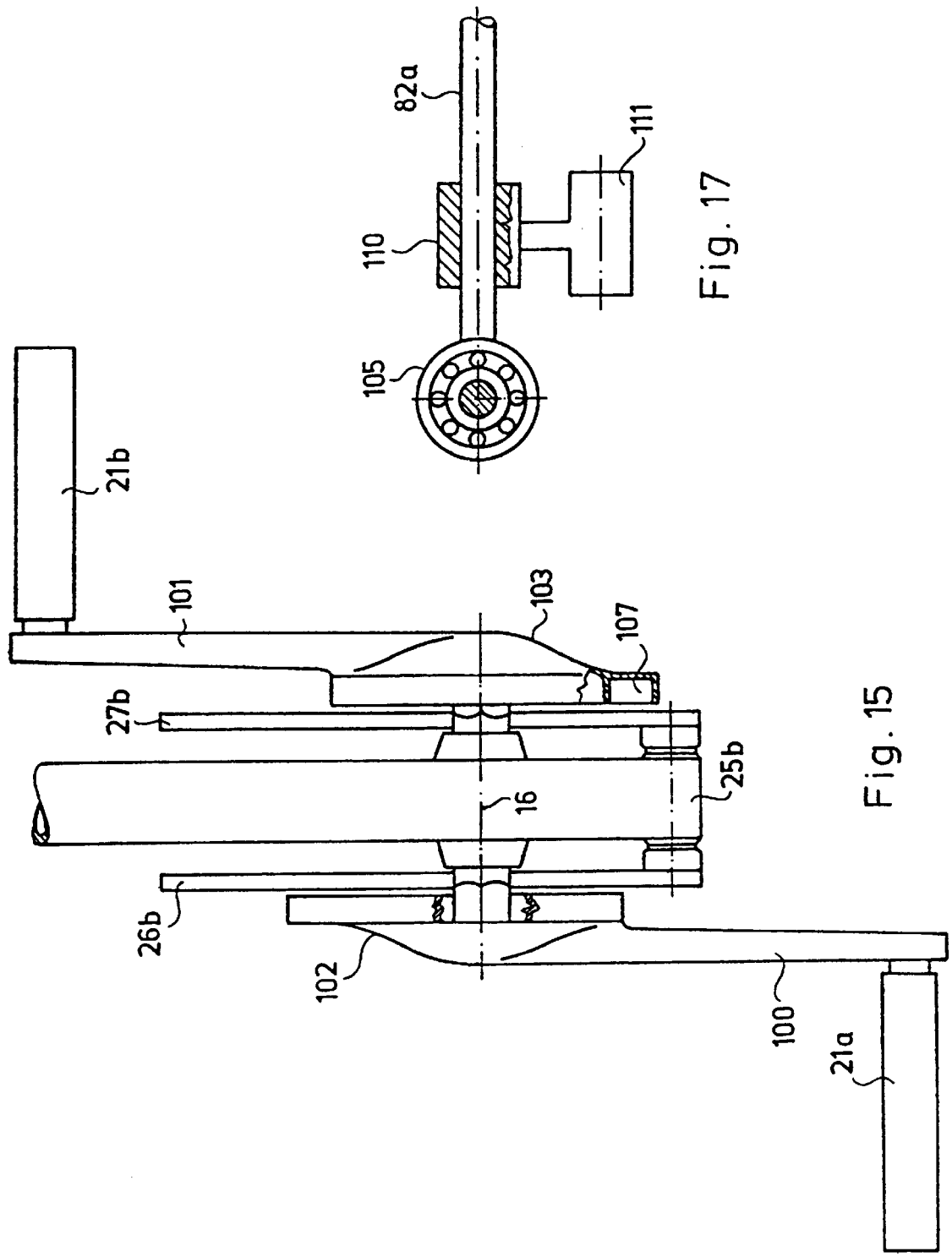
FIG. 15 shows the front view of a third embodiment of the invention.
Figure 16:
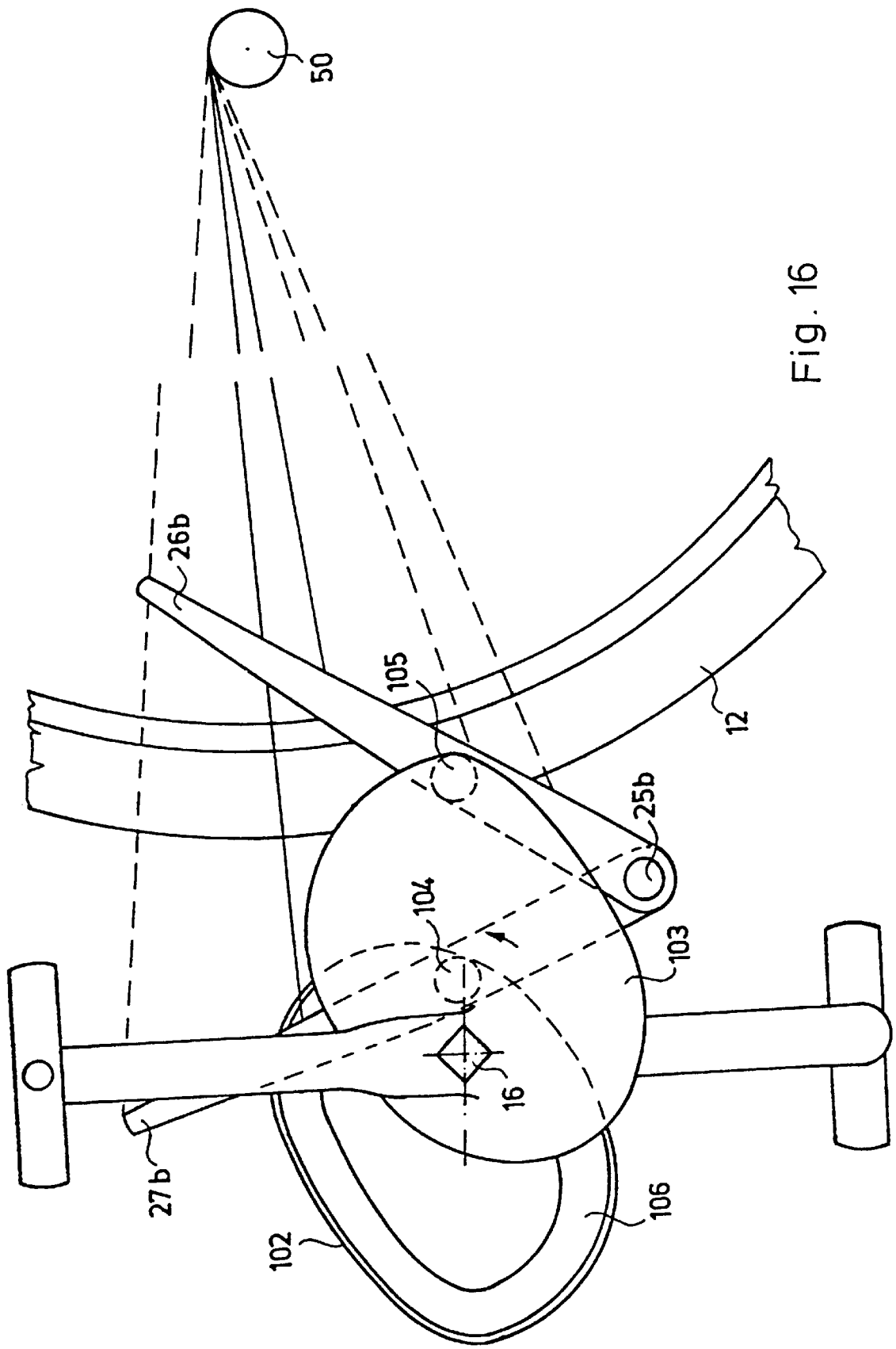
FIG. 16 shows the side view of this third embodiment.
Figure 18:
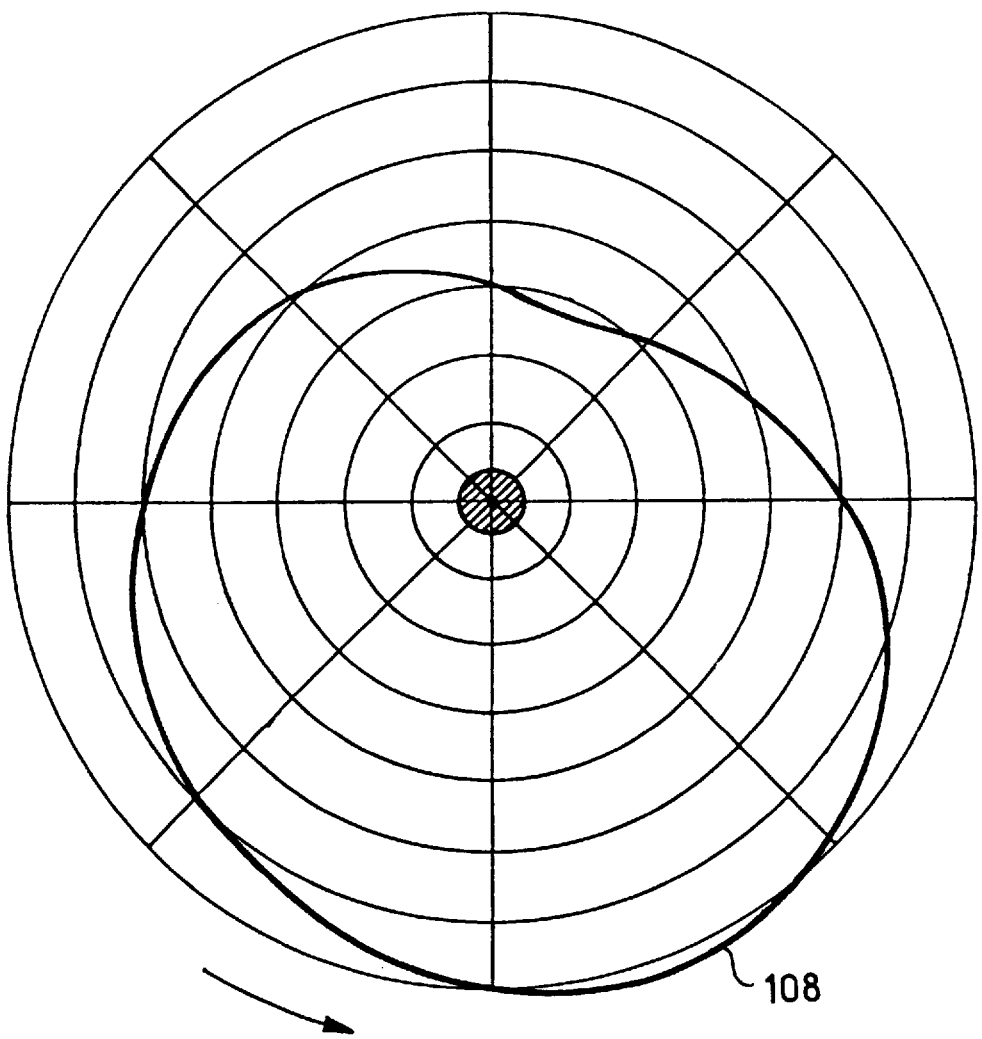
FIG. 18 shows a slot shape which has a characteristic curve similar to the curve of a circular chain-gear drive.
Figure 19:
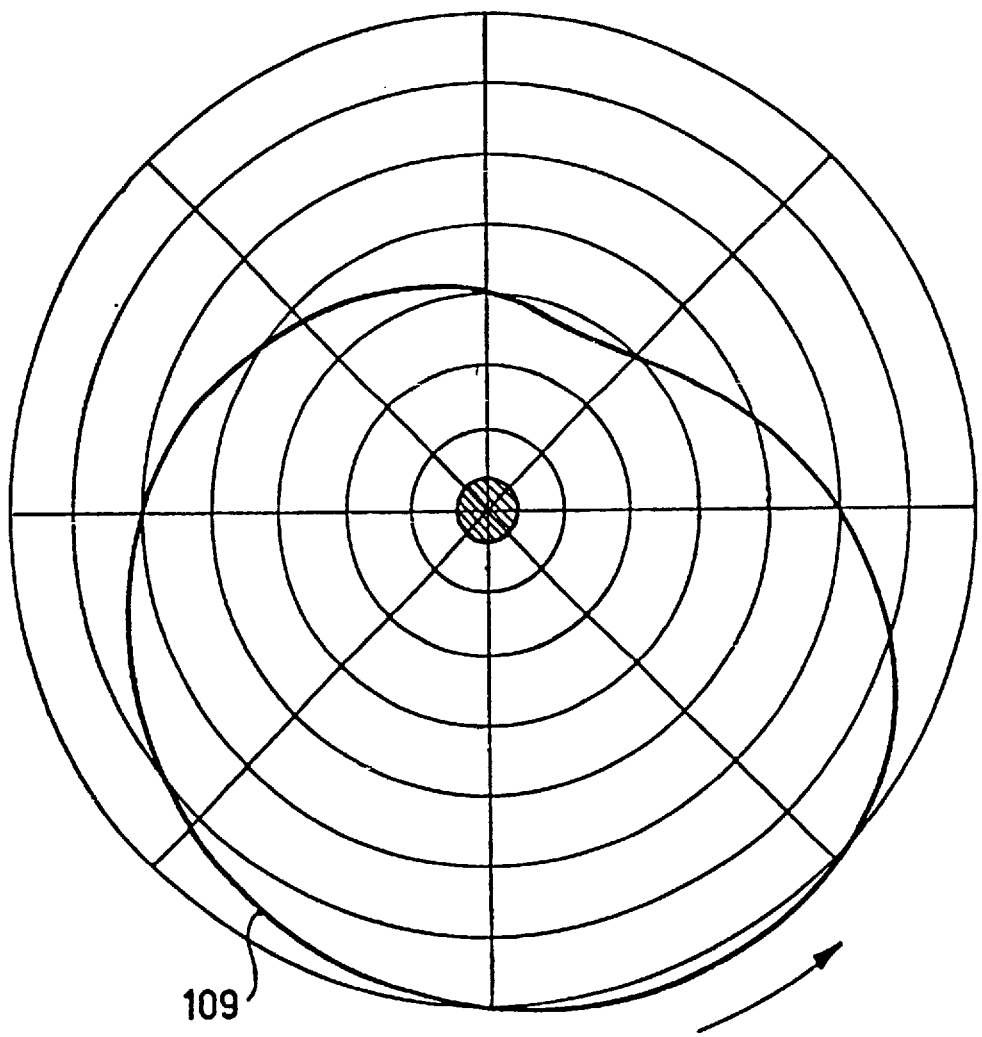
FIG. 19 shows a slot shape which has a "bio-pace" characteristic curve.

FIGS. 15 to 19 show a further embodiment of the alternating drive according to the invention. Respective pedals 21a, 21b are attached to both sides of the pedal shaft 16 each of which comprises a linear arm 100 or 101 and an eccentric disc 102 or 103 forming the inner end of the arm 100 or 101. The eccentric discs 102 and 103 are not circular but they have the shape as shown in FIG. 16 and FIGS. 18 and 19, which follows the form of a slot defined therein.

It can be seen in FIG. 16 that an auxiliary shaft 25b is provided behind and below the pedal shaft 16 and respective swinging arms 26b, 27b are pivoted to the auxiliary shaft 25b. In about the third length of the swinging arms 26b, 27b i.e. closer to the auxiliary shaft 25b respective studs project out from the swinging arms 26b, 27b in the direction of the eccentric discs 102, 103 and respective bearings 104, 105 are mounted on the studs. In FIG. 16 the bearings are covered by the disc 103, therefore they are shown by a dashed line. In the inner surface of the eccentric discs 102, 103 respective slots 106, 107 are provided which follow a closed shape and the width thereof corresponds to the outer diameter of the bearings 104, 105. The bearings 104, 105 are loosely fitted in the associated ones of the slots 106, 107 which have the main task of providing respective guiding channels for the bearings 104, 105.

In FIG. 15 at the partially sectional view the cross-section of the slot 107 can be seen, and FIG. 16 shows a major part of the slot 106 in front view. The shape of the slots 106 and 107 is identical, however, they are located in mirror symmetrical arrangement relative to the axis of the pedal shaft 16.

When the pedals 21a and 21b are rotated, the two eccentric discs 102, 103 will rotate therewith, and the slots 106 and 107 will guide and move the bearings 104, 105 fitted therein. The swinging arms 26b, 27b will be forced to an alternating swinging movement around the auxiliary shaft 25b under the effect of the bearings 104, 105 guided in the slots 106, 107. Owing to the use of bearings for the guided movement, the friction losses will be reduced and the two swinging arms 26b, 27b will be moved just as in the two previously described embodiments.

FIGS. 15 and 16 do not show the pulling elements that drive the rear wheel 12 which elements are mounted on the swinging arms 26b, 27b, however, for this purpose any of the previously described embodiment can be used. When the position of the pulling elements on the swinging arms is adjusted, the transmission ratio of the drive will also be changed, and the actual transmission ratio can be defined e.g. by the angular displacements of the rear wheel during a swinging period. The dashed lines in FIG. 16 that connect the ends of the swinging arms 26b, 27b with the rear shaft 50 of the rear wheel 12 illustrate the position that corresponds to the highest transmission ratio; while the other two dashed lines correspond to the smallest transmission ratio, wherein the pulling elements shown schematically by the dashed lines are coupled to the lowest possible position of the swinging arms 26b, 27b.

The characteristics of the drive depend on the shape of the slots 106, 107 that define a closed curved line and on the eccentric position of the pedal shaft in the interior of this closed curve. The characteristic properties of the drive can be calculated by computer-aided design. In case of using a slot shape illustrated in FIG. 18, the characteristic of the drive will correspond to that of conventional chain-driven bicycles using a circular gear. When the shape of the slot will correspond to the one shown in FIG. 19 by reference number 109, the characteristic of the drive will correspond to a so-called "bio-pace" characteristic preferred by mountain-bikers when using a rhombus-shaped driving gear with rounded corners. The term "driving characteristic" refers to the functional connection between the angular displacement of the pedal shaft and the angular displacement of the rear wheel. The driving characteristic of the first embodiment shown in FIGS. 1 to 8 is illustrated in FIG. 9. In this curve the actual working sections are always constituted by the upper curves, since simultaneously there are always two swinging arm displacements from which only the upper one is loaded, therefore from the two superimposed curves always the upper one should be considered. If the slot shape 108 shown in FIG. 18 is used, a resulting characteristic curve is obtained which in contrast to the upper curve of FIG. 9 will be a line parallel to the horizontal axis. This means that in any angular position a unity angular displacement of the pedal will result in a uniform constant angular displacement of the rear wheel. A completely linear driving curve can be obtained if the respective driving curves of the two sides of the bike are exactly superimposed on each other, i.e. when the speed of say the left swinging arm in a direction has reached the speed of the right swinging arm and this latter arm moves thereafter for a short time in the same direction before reversing the direction. In case of the slot shape 109 shown in FIG. 19 the driving curve is not linear but consists of slightly curved sections.

Each previously shown embodiments of the alternating drive according to the invention comprises two swinging arms driving respective ones of the two free-wheels in the rear wheel. The swinging arms operate as single armed levers and the continuous control of the transmission ratio can be carried out by changing the distance between the connection points of the drives and the center of rotation of the swinging arms. In a great portion of commercially available bicycles, the transmission ratio cannot be adjusted at all. Such bicycles are popular due to their low price. In the present alternating drive a non-adjustable transmission ratio can be realized if the pulling elements are attached to a point of the swinging arms at a predetermined height. In case of the embodiment shown in FIGS. 15 and 16, there can be no need for the swinging arms. If the bearings 104, 105 fitted in the eccentric disc 102, 103 are not positioned on swinging arms but as shown in FIG. 17 they are arranged at the front end of a pulling bar 82a designed similarly to the rear pulling bar of the previous embodiment, and this rear pulling bar 82a is guided in a sleeve 110, then upon rotation of the associated eccentric disc the pulling bar 82 will reciprocate in forward-to-backward direction so that this movement is guided by the sleeve 110. The sleeve 110 is clamped to the rear fork of the frame of the bicycle. This is an example how the drive can operate without swinging arms. This embodiment is, however, inappropriate for adjusting the transmission ratio.

An important advantage of the drive according to the invention compared to other kinds of alternating drives lies in that the driving characteristic and in case of certain embodiments also the transmission ratio can be changed.

In case of three of the described embodiments of the alternating drive according to the invention the circular movement of the pedals 21 driven by the rider around the pedal shaft 16 will be converted into an alternating swinging movement of the swinging arms 26, 27. In the first embodiment this conversion was made possible by the pulling bar 23 pivoted at both ends. In the second embodiment the swinging arms were designed as guiding elements, and the bearing at the connection zone of the two parts of the pedal arms at the knee region was moved by the swinging arms, and in the third embodiment the closed shaped slots made in the eccentric discs guided the bearings coupled to the swinging arms.

The characteristic curve defined between the rotation of the pedal and of the rear wheel can be changed most easily in case of the third embodiment, it is sufficient to change the shape of the slot and/or the location of the center of rotation.

Although the drive according to the invention has been described in connection with the drive of a bicycle, it is obvious that such a drive can be used to convert the circular movement of any shaft to the circular movement of a remotely located other shaft with an appropriate transmission ratio and transmission characteristic. Thus, the invention cannot be limited to bicycles only.

We claim:

1. An alternating drive for wheeled vehicles, comprising:
   a pair of pedals movable along circular paths around a pedal shaft pivoted to the frame of the vehicle, the pedals being on opposite sides of the frame;
   a pair of swinging arms pivoted around an auxiliary shaft attached to the frame and having a swinging movement within a predetermined angular range closer to a vertical than to a horizontal direction;
   transmission means arranged between the swinging arms and the pedal for converting circular movement of the pedals into an alternating swinging movement of the swinging arms with a phase difference of a half swinging period;
   a pair of free-wheel mechanisms, having wire drums and opposite locking directions, arranged respectively on both sides of a driven axis of the vehicle; and
   flexible pulling elements respectively connecting the free-wheel mechanisms with the swinging arms and being wound around sections of respective wire drums.

2. The alternating drive as claimed in claim 1, further comprising a pair of shanks between the pedal shaft and the pedal, the shanks being interconnected rigidly by means of a short shaft, the shanks being fixed in a cranked position, the swinging arms defining respective elongated internal openings, and the short shaft being guided in the openings.

3. The alternating drive as claimed in claim 2, further comprising bearings on the shanks for guiding in the shanks in the openings.

4. The alternating drive as claimed in claim 1, further comprising eccentric discs connected to the pedals respectively having closed contour surfaces and being positioned in a mirror symmetrical arrangement, and the pedal shaft extending through the eccentric discs and being fixed thereto, and the swinging arms being forced into the swinging movement by the contour surfaces.

5. The alternating drive as claimed in claim 4 further comprising guiding elements fixed to the swinging arms, and slots in the eccentric discs, wherein the guiding elements move in the slots.

6. The alternating drive as claimed in claim 5, wherein the guiding elements are bearings fixed to a central section of the swinging arms.

7. The alternating drive as claimed in any of claims 4 to 6, wherein the closed contour surfaces have a shape defining a driving characteristic that corresponds to the characteristic of a conventional chain-drive effective between the pedal shaft and the rear shaft driven by means of a circular gear.

8. The alternating drive as claimed in any of claims 4 to 6, wherein the closed contour surfaces have a shape defining a driving characteristic that corresponds to the characteristic of a conventional chain-drive effective between the pedal shaft and the rear shaft driven by means of a rhombus gear with rounded profile.

9. The alternating drive as claimed in any of claims 1 to 6, wherein the swinging arms comprising respective connection points for the pulling elements, wherein the distance between the connection points and the auxiliary shaft can be adjusted between two extreme values.

10. The alternating drive as claimed in any of claims 1 to 6, wherein a sub-assembly comprising the pulling elements and the free-wheel mechanisms comprises biasing means for keeping the pulling elements biased.

11. The alternating drive as claimed in any of claims 1 to 6, wherein the swinging arms are coupled via respective pivoted connections with rigid rear pulling bars and respective parts of the pulling bars located during the reciprocating movement thereof forwards of and behind the rear shaft of the rear wheel are connected to pulling and biasing wires wound around the free-wheel mechanisms to rotate the mechanisms forward and backwards during the movement.

12. The alternating drive as claimed in claim 11, wherein outer sides of the free-wheel mechanisms are wire drums, the parts of the pulling bars located forwards of the rear shaft are coupled by respective biasing elements to first ends of respective pulling wires, other ends of the pulling wires are coupled to the wire drums, and the parts located behind the rear shaft are coupled through respective wire biasing mechanisms to first ends of the biasing wires having other ends coupled to the wire drums.

* * * * *